(12) United States Patent
Hulin et al.

(10) Patent No.: US 6,988,863 B2
(45) Date of Patent: Jan. 24, 2006

(54) FASTENER FOR CONNECTING AND SPACING PARTS

(75) Inventors: Martial Hulin, Liancourt (FR); Domingos Castro, La Rue Saint Pierre (FR); Jean-Pierre Lesecq, Cormeilles en Parisis (FR)

(73) Assignee: I.T.W. de France, Beauchamp (FR)

( * ) Notice: Subject to any disclaimer, the term of this patent is extended or adjusted under 35 U.S.C. 154(b) by 0 days.

(21) Appl. No.: 10/777,901

(22) Filed: Feb. 13, 2004

(65) Prior Publication Data

US 2004/0170491 A1 Sep. 2, 2004

(30) Foreign Application Priority Data

Feb. 27, 2003 (FR) .................................. 03 02408

(51) Int. Cl.
*F16B 21/00* (2006.01)
*F16B 31/00* (2006.01)

(52) U.S. Cl. ........................ 411/553; 411/549; 411/3; 411/5

(58) Field of Classification Search ................ 411/553, 411/546, 508, 511, 514, 523, 361, 362, 367, 411/383, 3, 5, 549
See application file for complete search history.

(56) References Cited

U.S. PATENT DOCUMENTS

| 3,810,279 | A | * | 5/1974 | Swick et al. ............... 411/509 |
| 3,889,320 | A | * | 6/1975 | Koscik ....................... 24/297 |
| 3,893,208 | A | * | 7/1975 | Yuda .......................... 411/508 |
| 4,122,583 | A | * | 10/1978 | Grittner et al. ............. 24/703.1 |
| 4,312,614 | A | * | 1/1982 | Palmer et al. ................ 411/44 |
| 4,502,193 | A | * | 3/1985 | Harmon et al. .............. 24/621 |
| 4,715,095 | A | * | 12/1987 | Takahashi .................... 24/453 |
| 4,762,437 | A | * | 8/1988 | Mitomi ........................ 403/11 |
| 4,936,066 | A | * | 6/1990 | Rutsche et al. ............. 52/238.1 |
| 4,952,106 | A | * | 8/1990 | Kubogochi et al. .......... 411/48 |
| 5,173,026 | A | * | 12/1992 | Cordola et al. ............. 411/508 |
| 5,689,863 | A | * | 11/1997 | Sinozaki ...................... 24/297 |
| 5,868,537 | A | * | 2/1999 | Latal et al. ................. 411/418 |
| 5,871,320 | A | * | 2/1999 | Kovac ......................... 411/182 |
| 6,237,970 | B1 | | 5/2001 | Joannou ...................... 292/241 |
| 6,435,790 | B1 | * | 8/2002 | Ichikawa ..................... 411/349 |
| 6,752,576 | B2 | * | 6/2004 | Johansson et al. ............ 411/21 |

FOREIGN PATENT DOCUMENTS

| DE | 196 20 102 A1 | 11/1996 |
| FR | 2 549 532 | 1/1985 |
| GB | 1 418 003 | 12/1975 |

* cited by examiner

*Primary Examiner*—Flemming Saethar
*Assistant Examiner*—David Reese
(74) *Attorney, Agent, or Firm*—Lowe Hauptman & Berner, LLP

(57) ABSTRACT

Fastener (1) includes a head (2) and a body (3). The head (2) has a transverse stop (5) able to bear on the first piece (23). The body (3) has a first spacer (10) and a second spacer (11), coaxial and disposed in line with each other in an axial direction. The first spacer (10), adjacent to the head (2), has a diameter greater than that of the second spacer (11) which extends starting from the first spacer (10), on the opposite side from the head (2). Each of the spacers (10, 11) has at least one lug (13; 18).

12 Claims, 3 Drawing Sheets

FASTENER FOR CONNECTING AND SPACING PARTS

FIELD OF THE INVENTION

The invention relates to the field of the fastening and positioning of mechanical parts.

It concerns more particularly a fastener comprising spacers adapted for the assembly of two parts each comprising a through-hole.

BACKGROUND OF THE INVENTION

In numerous fields, in particular the automotive field, it is necessary to have available fasteners capable of connecting two parts together while ensuring the double function of relative fixing as well as spacing.

Mechanical parts of all types, such as mechanical links, axles or rods thus need to be connected to the frame or structure of the system to which they belong, while being held away from that frame or structure.

Furthermore, such fasteners must be designed to promote rapid assembly, often performed blind, within mechanical structures with difficult access.

Devices of the prior art are already capable of fulfilling these functions. For example, a simple screw/nut system provided with a spacer, or a rivet tightened after spacing apart of the parts, or again certain types of resin.

Although these known devices ensure the fixing and spacing of the parts, they have high mechanical complexity making them difficult to implement on an automated production line. Their assembly requires different operations (the spacing apart and fixing being ensured by different parts) and their withdrawal, when possible, is also complex.

SUMMARY OF THE INVENTION

The object of the invention is to provide a simple fastener ensuring the functions described above and being easy to mount, in order to be suitable for automation and/or for implementation in conditions where access is difficult.

To that end the invention relates to a fastener comprising a head and a body, intended for connecting a first piece and a second piece, each comprising a through-hole with a predetermined contour, the first and second pieces having respectively a first and second predetermined thickness, characterized in that the head comprises a transverse stop able to bear on the first piece, and in that the body comprises a first spacer and a second spacer, coaxial and disposed in line with each other in an axial direction, the first spacer, adjacent to the head, having a diameter greater than that of the second spacer which extends starting from the first spacer, on the opposite side from the head, each of the spaces comprising at least one lug, the lugs on the first spacer being separated from the head by a distance corresponding substantially to the said first thickness and the lugs on the second spacer being separated from the first spacer by a distance corresponding substantially to the said second thickness, the lugs on the first spacer being aligned with the lugs on the second spacer.

Such a fastener is adapted to be easily mounted, in a single operation. The principle of lugs fixed on the spacers permits the locking of the fastener onto the first part and onto the second part, simultaneously, by a simple rotation of the body.

The withdrawal of the fastener is not only possible but as simple as the mounting of which the operations are repeated in the opposite order.

These operations are limited to the insertion of the fastener then to its rotation for example through a quarter turn.

According to one embodiment, the fastener is made in a single piece.

The structure of the fastener makes such one-piece manufacture possible, for example by molding, which is simpler and thus the cost is advantageous.

According to a preferred feature of the invention, the join between the first spacer and the second spacer forms a shoulder defining a transverse abutment surface.

This transverse abutment surface plays the same role for the second part as the transverse stop bearing on the first part.

Each of the parts is thus held on one of its faces by a surface or a transverse stop, and on the other of its faces by the lugs respectively arranged on the first and second spacers.

Additional functions may furthermore be provided in accordance with the features of the fastener described.

Thus, the second spacer may comprise, at its join with the first spacer, a frangible region of lesser thickness.

When forces in opposite directions are applied to the parts, with the fastener in place, the shear or tension stress produced will result in the rupture of that frangible region.

The force threshold to reach to cause the rupture is determined by the dimensions of the frangible region and by the properties of the material used in manufacture.

Furthermore, for improved bearing on the first part, the transverse stop on the head may be a projecting collar on the periphery of the head.

Other preferred features of the invention relate to this collar. It may be elastically deformable in the axial direction so as to ensure take-up of axial play.

Stable fastening is thus obtained, even after rotation of the fastener.

Similarly, the collar may comprise two cut-outs leaving an axially movable locking tooth.

This locking tooth inserts into a cavity provided on the first part. This cavity is positioned such that the locking tooth comes opposite to it after rotation of the fastener.

The width of the said locking tooth may be substantially equal to the width of the lugs of the first. This makes it possible to lock the tooth directly onto a part of the through hole of the first part.

According to another preferred feature of the invention, the second spacer comprises a chamfer at its end that is opposite from the head.

This chamfer forms a frusto-conical portion on the end of the second spacer. As the fastener according to the invention is adapted to be inserted in two coaxial holes, this frusto-conical portion facilitates the entry of the fastener into its housing.

Similarly the lugs of the second spacer may comprise beveled portions adapted to facilitate the entry of the fastener into its housing or adapted to facilitate the operation of locking by rotation of the fastener.

BRIEF DESCRIPTION OF THE DRAWINGS

Other features and advantages of the invention appear in the light of the following description of a preferred embodiment, given by way of non-limiting example, and made with reference to the accompanying drawings in which.

DETAILED DESCRIPTION OF THE PREFERRED EMBODIMENTS

Figure 1:
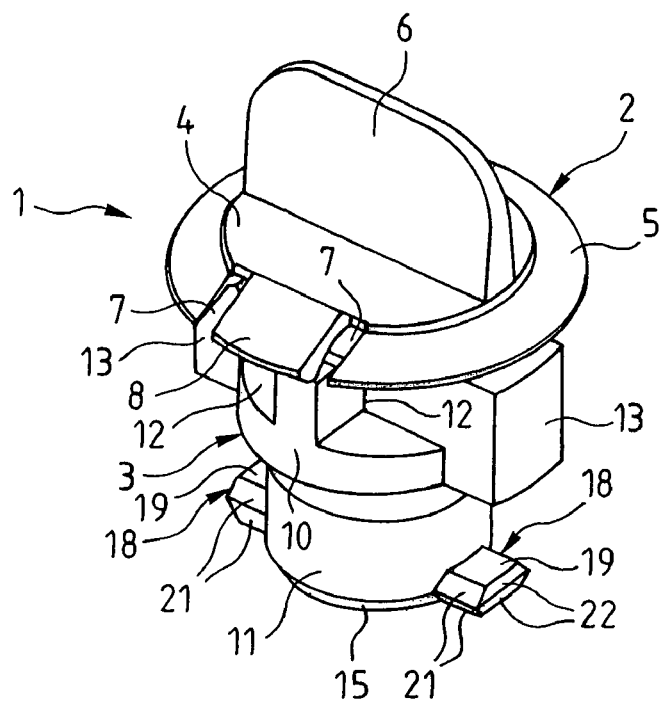
FIG. 1 is a perspective view of a fastener according to the present invention.

The fastener 1 appearing in isolation in FIGS. 1 to 4 comprises a head 2 and body 3 as its main parts.

The head 2 is adapted for the manipulation of the fastener 1 and comprises a transverse disc 4 of which the periphery is provided with a projecting collar 5.

Means for manipulation are also provided on the head 2, here comprising a tongue 6 for gripping, since the fastener 1 is adapted in the present embodiment, for being manipulated by hand.

Figure 3:
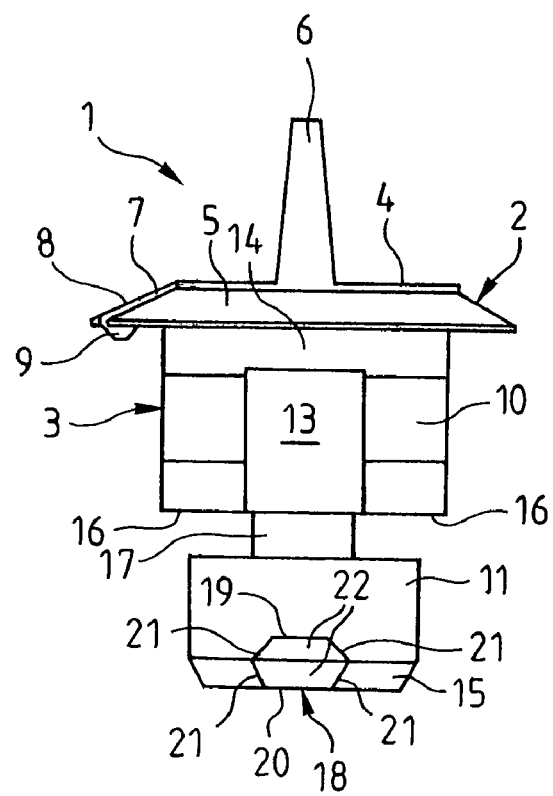
FIG. 3 is a side view of the fastener of FIG. 1.

With reference to FIG. 3, the tongue 6 for this purpose has faces that converge towards each other so as to be able to be grasped optimally between the thumb and index finger of the user.

The collar 5 is formed by a frusto-conical wall delimiting a circle of smaller diameter and a circle of larger diameter, the circle of smaller diameter being attached to the edge of the transverse disc 4 and the circle of larger diameter being positioned around the body 3.

Figure 2:
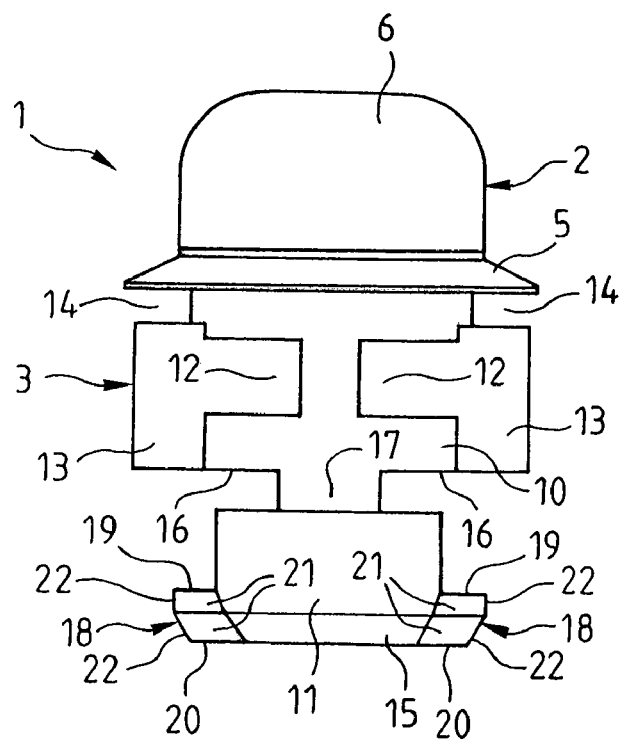
FIG. 2 is a front view of the fastener of FIG. 1.

As can be seen in FIGS. 2 and 3, the collar 5 thus forms a frusto-conical surface flaring from the disc 4 towards the body 3.

The collar 5 is moreover constituted by an elastic material enabling it to be deformed when a force is applied to it tending to bring the circle of larger diameter into the plane of the transverse disc 4.

Figure 4:
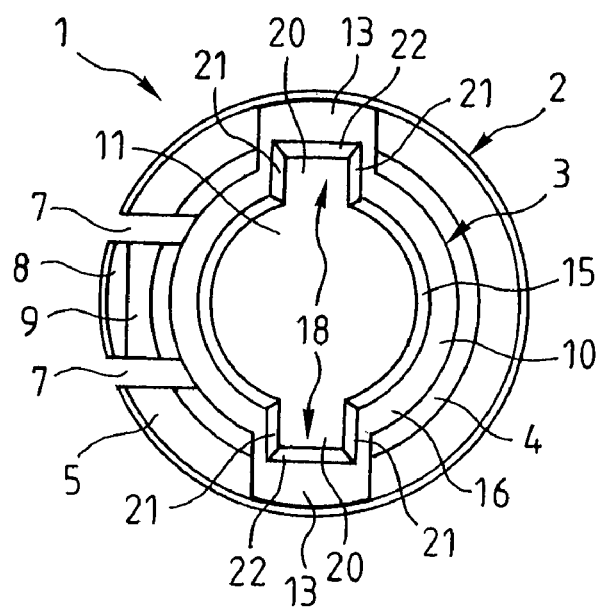
FIG. 4 is a top view of the fastener of FIG. 1.

FIGS. 1 and 4 show furthermore that the collar 5 comprises two cut-outs 7 delimiting a locking tooth 8.

The locking tooth 8 is thus movable in the axial direction, that is to say in the general direction in which the fastener 1 extends, independently of the rest of the collar 5.

Tooth 8 further comprises a projection 9 (FIG. 3), in the direction of the body, adapted to ensure the locking of the fastener in the manner set out hereinafter.

The body 3 of the fastener 1 comprises a first spacer 10 attached to the head 2 so as to be coaxial with the transverse disc 4 of the head 2. A second spacer 11 is also provided on the body 3, this spacer 11 being coaxially attached to the first spacer 10 on the opposite side from the head 2.

The transverse disc 4 of the head 2, the first spacer 10 and the second spacer 11 are all three coaxially disposed, their common axis defining the general direction in which the fastener 1 extends.

The first spacer 10 has the form of a cylinder which comprises recesses 12 as well as two lugs 13 projecting from the contour of the cylinder.

The recesses 12 are formed, according to the present embodiment, in the first spacer 10 for reasons of economy of material on molding as well as for improvement in the weight of the finished part.

Other recesses may be provided in the same manner provided that the initial cylinder keeps a circular section.

The lugs 13 project from the contours of the cylinder in a substantially parallelepiped form. Nevertheless, the faces of the lug 13 that are remote from the cylinder are rounded such that the lugs 13 are contained within the collar 5 of the head 2 when the fastener 1 is viewed from below (FIG. 4).

With reference to FIG. 2, the height of the lugs 13 substantially corresponds to two-thirds of the height of the spacer 10 to which they correspond and are disposed flush with the end that is on the opposite side from the head 2 of the first spacer 10. A space 14 is provided in this manner between the lugs 13 and the head 2 (the space here having a height of approximately one-third of the height of the first spacer 10) or more specifically between the lugs 13 and the collar 5 of the head 2.

The height of the space 14 is dimensioned depending on the thickness of one of the parts to assemble as set out later.

The second spacer 11 is formed from a solid cylinder nevertheless comprising a chamfer 15 at its end that is opposite from the head 2.

The diameter of this cylinder is less than the diameter of the cylinder forming the first spacer 10 so as to create a shoulder, that is to say that when the fastener 1 is viewed from the side (FIGS. 2 and 3), the first spacer 10 has a transverse abutment surface 16 extending beyond the projection of the contour of the second spacer 11 on the end that is opposite from the head 2 of the first spacer 10.

This abutment surface 16 may thus bear on a part when the second spacer has been inserted in an aperture made in said part (the diameter of this aperture being greater than that of the second spacer 11 but less than that of the first spacer 10).

The second spacer 11 is attached to the first spacer 10 by a cylindrical region 17 having a diameter less than that of the cylinder forming the second spacer 11.

This region of lesser thickness 17 is destined to form a frangible region adapted to break above a predetermined shear force, it being possible for the shear force to be created by a relative displacement of the two fastened parts, when fastener 1 is in place.

To hold fastener 1 in place on those two fastened parts, the second spacer 11 is provided with two diametrically opposed lugs 18 projecting transversely of the spacer 11, at its end that is on the opposite side from the first spacer 10.

The lugs 18 are thus attached to the second spacer 11 adjacent the chamfer 15.

As for the first spacer 10, a space is thus provided between the lugs 18 of the second spacer 11 and the lugs 13 of the first spacer 10, this space corresponding to the thickness of one of the parts to assemble.

The lugs 18 of the second spacer 11, of which one is visible from the side in FIG. 3, each comprise an upper surface 19 and a lower surface 20, as well as beveled side walls 21.

The characterization of these surfaces as upper, lower and side is made with reference to the fastener 1 in the position of FIG. 3.

Moreover, considering FIG. 2 again, the lugs 18 of the second spacer 11 also comprise a bevel 22 on their end wall, that which is on the opposite side from the spacer 11.

The fastener 1 which has just been described may be utilized in the manner indicated below.

Figure 6:
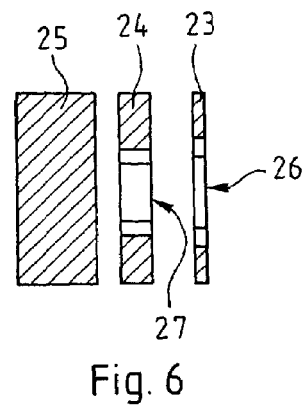
FIG. 6 is a side view on VI—VI of the assembly of parts of FIG. 5, solely the two perforated parts being adapted to be assembled by the fastener of FIG. 1.
Figure 7:
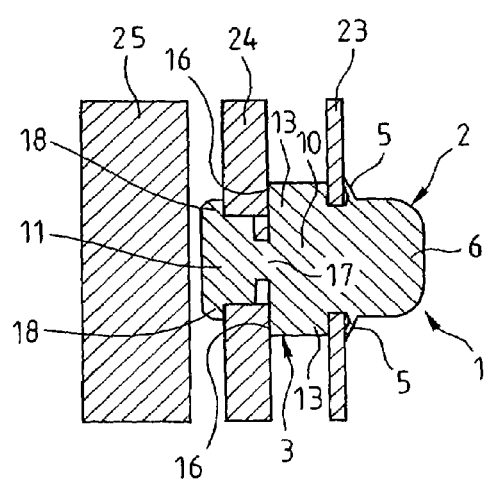
FIG. 7 is a top view in section on VII—VII of the assembly of parts of FIG. 5, two of those parts being assembled by the fastener of FIG. 1.

The fastener 1 is adapted to rigidly assemble a first part 23 and a second part 24, while maintaining a space between the two of them, in accordance with the assembly of FIG. 7. The presence of a third part 25 close to the second part 24 does not participate in said assembly but, in FIGS. 6 to 8, makes it possible to simulate an environment in which the second part 24 is not accessible and in which that second part 24 is disposed virtually against another member (here the third part 25), leaving little space for the lugs 18 of the second spacer 11.

Figure 5:
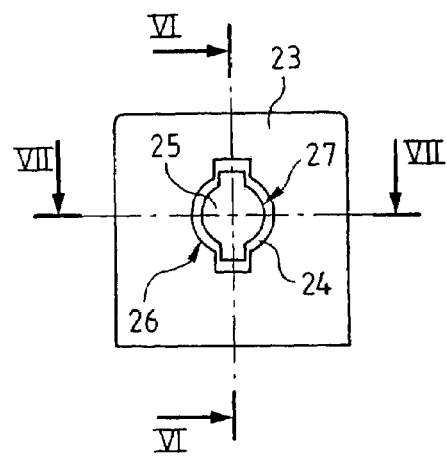
FIG. 5 is a front view of an assembly of parts adapted to be assembled by the fastener of FIG. 1, this Figure showing the profile of the perforations adapted to cooperate with the fastener.

With reference to FIG. 5, the two parts 23, 24 to be assembled each comprise a perforation 26, 27 passing all the way through having the form of a circular hole associated with two diametrically opposed rectangular holes biting into the periphery of the circular hole.

This configuration of the perforations 26,27 makes it possible to introduce into each of them a spacer provided with lugs and to lock it by a quarter turn as explained further on.

The two perforations 26, 27 have identical shape but are of different size: perforation 26 of the first part 23 is larger than perforation 27 of the second part 24. The diameter of the circular hole of perforation 26 of the first part 23 corresponds to the diameter of the first spacer 10 of the fastener 1, and the width of the rectangular diametrically opposed holes corresponds to the width of the lugs 13 of the first spacer 10.

Similarly, the diameter of the circular hole of perforation 27 of the second part 24 corresponds to the diameter of the second spacer 11 of the fastener 1 and the width of the rectangular diametrically opposed holes corresponds to the width of the lugs 18 of the second spacer 11.

Finally, the thickness of the first part 23 corresponds to the distance 14 separating the first spacer 10 from the head 2 and the thickness of the second part 24 corresponds to the distance between the first spacer (more specifically: the abutment surface 16) and the upper surface 19 of the lugs 18 of the second spacer 11. Since parts 23, 24 have perforations 26, 27 satisfying these conditions, it is possible to assemble and space them with the fastener 1.

The two parts 23, 24 are first of all put into position in accordance with FIGS. 5 and 6, that is to say such that the perforations 26, 27 are coaxial and such that the two pairs of rectangular holes are in line with each other.

Fastener 1 is then inserted through the two perforations 26, 27, the lugs 13, 18 being positioned face-to-face with the rectangular holes of the perforations 26, 27.

Note that the chamfer 15 and the bevels 21, 22 of lugs 18 of the first spacer 11 are adapted to facilitate the insertion of the fastener 1.

This insertion is made with one hand, holding the tongue 6 between the thumb and the index finger, and may consequently be performed blind.

Once the fastener 1 has been fully inserted through both parts 23, 24, the user must still exert a force to press the head 1 against the first part 23, elastically deforming the collar 5, and simultaneously rotate the fastener 1 by a quarter turn.

The bevels 21 of the lugs 18 of the second spacer 11 serve here to facilitate the start of this rotation, for example alleviating the fact that the fastener 1 may be insufficiently pressed against the first part 23, this pressing being necessary in order for the lugs 13, 18 to be freed from the rectangular holes of the two perforations 26, 27.

Figure 8:
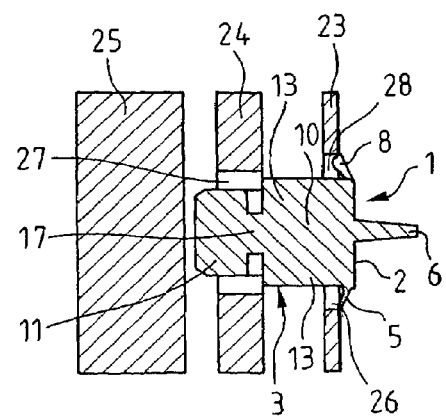
FIG. 8 is a section view of the assembly of FIG. 7, with the same section as in FIG. 6.

Once the quarter locking turn has been made, the fastener 1 is in place on the two parts 23, 24 as represented in FIGS. 7 and 8.

FIG. 7 shows the holding of the first part 23 between the lugs 13, 18 and the holding of the second part between the collar 5 and the lugs 13 of the first spacer 10. The elasticity of the collar 5 is taken advantage of to take up the plays of the assembly or to compensate for creep of the fastener 1.

FIG. 8 shows the locking tooth 8 of which the projection 9 becomes inserted in a cavity 28 arriving opposite that tooth 8 after the quarter locking turn has been made. This cavity 28 may be a cavity specially created for that purpose or else, as is the case here, cavity 28 may be one of the rectangular holes of the perforation 26 of the first part 23.

The third part 25, or any other member preventing access to one of the sides of the assembly, in no way interferes with the mounting operation described due to the insertion of the fastener from a single side and due to the fineness of the lugs 18 of the second spacer.

The frangible region 17 is thus positioned within the thickness of the second part 24 (see FIGS. 7 and 8), flush with that part on the side of the abutment surface 16 of the first spacer 10.

In this position, the rupture of this frangible region 17 leads to the separation of parts 23, 24 but the maintenance of their spacing since the part of the fastener 1 formed of the head 2 and the first spacer 10 remains in place on the first part 23.

The force necessary for the rupture of the frangible region 17, in shear or in tension, may be calibrated to correspond to a stress limit induced by a relative movement between the two parts 23, 24. This is the case when such an assembly is adapted to remain integral under that stress limit and, on the contrary, be broken above it.

Depending on the desired value of this stress limit and on the material used to form the fastener 1, the frangible region 17 may be dimensioned by calculation and/or empirically, through rupture tests.

What is claimed is:

1. A fastener, comprising a head and an elongated body extending in an axial direction thereof downwardly from said head;
   said elongated body comprising, in said axial direction, a first enlarged portion connected to an underside of said head via a first neck portion having a cylindrical perimeter, and a second enlarged portion connected to said first enlarged portion via a second neck portion having a cylindrical perimeter which is smaller than that of the first neck portion, whereby sheet materials having openings can be accommodated around said neck portions between said first enlarged portion and said head and between said first and second enlarged portions;
   each of said enlarged portions being rigidly formed with said elongated body so as to not be radially deformable relative thereto and having a maximum dimension and a minimum dimension respectively in first and second radial directions perpendicular to said axial direction;
   wherein the dimensions of said enlarged portions in said first and second radial directions are not greater than respective dimensions of said head in said first and second radial directions; and
   wherein each of said enlarged portions has the maximum dimension and the minimum dimension respectively in the same first and second radial directions which are perpendicular to each other.

2. The fastener according to claim 1, being made in a single piece.

3. The fastener according to claim 1, wherein the head comprises a tongue for manual gripping.

4. The fastener of claim 1, wherein the dimensions of said second enlarged portion in said first and second radial directions are smaller than the respective dimensions of said first enlarged portion in said first and second radial directions; and the dimensions of said first enlarged portion in said first and second radial directions are smaller than the respective dimensions of said head in said first and second radial directions.

5. The fastener of claim 1, wherein each of said enlarged portions includes a central cylindrical portion and at least one lug extending outwardly from said cylindrical portion in said first radial direction to define the maximum dimension of the respective enlarged portion, the cylindrical portions of said enlarged portions being coaxial with one another and with the head which is circular in cross section.

6. The fastener of claim 5, wherein each of said enlarged portions includes two said lugs extending outwardly from two diametrically opposite locations on the respective cylindrical portion to define the maximum dimension of the respective enlarged portion.

7. A fastener, comprising a head and an elongated body extending in an axial direction thereof downwardly from said head;

said elongated body comprising, in said axial direction, a first enlarged portion connected to an underside of said head via a first neck portion, and a second enlarged portion connected to said first enlarged portion via a second neck portion, whereby sheet materials having openings can be accommodated around said neck portions between said first enlarged portion and said head and between said first and second enlarged portions;

each of said enlarged portions being rigidly formed with said elongated body so as to not be radially deformable relative thereto and having a maximum dimension and a minimum dimension respectively in first and second radial directions perpendicular to said axial direction;

wherein the dimensions of said enlarged portions in said first and second radial directions are not greater than respective dimensions of said head in said first and second radial directions;

wherein each of said enlarged portions has the maximum dimension and the minimum dimension respectively in the same first and second radial directions which are perpendicular to each other; and wherein, in the whole elongated body, said second neck portion has smallest dimensions in both said first and second radial directions, thereby defining a weakest point of said elongated body which will be first ruptured upon application of sufficient stress to said elongated body.

8. A fastener, comprising a head and an elongated body extending in an axial direction thereof downwardly from said head;

said elongated body comprising, in said axial direction, a first enlarged portion connected to an underside of said head via a first neck portion, and a second enlarged portion connected to said first enlarged portion via a second neck portion, whereby sheet materials having openings can be accommodated around said neck portions between said first enlarged portion and said head and between said first and second enlarged portions;

each of said enlarged portions being rigidly formed with said elongated body so as to not be radially deformable relative thereto and having a maximum dimension and a minimum dimension respectively in first and second radial directions perpendicular to said axial direction;

wherein the dimensions of said enlarged portions in said first and second radial directions are not greater than respective dimensions of said head in said first and second radial directions;

wherein each of said enlarged portions has the maximum dimension and the minimum dimension respectively in the same first and second radial directions which are perpendicular to each other; and wherein said head comprises a transverse wall having a central region to which said elongated body is connected; and a collar extending downwardly from a periphery of said transverse wall and obliquely, away from said central region of said transverse wall;

wherein said collar comprises two cut-outs which define therebetween an axially movable locking tooth.

9. The fastener of claim 8, wherein said collar has only one said tooth, a remainder of said collar extending circumferentially of said fastener without interruption from one of said cut-outs to another.

10. The fastener of claim 8, wherein said tooth has a material thickness greater than a remainder of said collar.

11. In combination, first and second sheet members each being formed with an opening having a maximum dimension and a minimum dimension respectively in first and second radial directions perpendicular to an axial direction of said opening, the openings of said first and second sheet members being aligned with each other; and a fastener comprising a head and an elongated body extending, in the axial direction of said openings, from said head through said openings;

wherein said elongated body comprises, in said axial direction, a first enlarged portion connected to an underside of said head via a first neck portion and a second enlarged portion connected to said first enlarged portion via a second neck portion;

said first sheet member is disposed between said first enlarged portion and said head with said first neck portion located in the opening of said first sheet member;

said second sheet member is disposed between said first and second enlarged portions with said second neck portion located in the opening of said second sheet member;

each of said enlarged portions is rigidly formed with said elongated body so as to not be radially deformable relative thereto and has a maximum dimension and a minimum dimension respectively in the second and first radial directions perpendicular to said axial direction;

the dimensions of said enlarged portions in said first and second radial directions are not greater than respective dimensions of said head in said first and second radial directions;

each of said enlarged portions has the maximum dimension and the minimum dimension respectively in the same second and first radial directions which are perpendicular to each other;

the maximum dimension of said second enlarged portion is smaller than the maximum dimensions of said first and second openings and is greater than the minimum dimension of said second opening, thereby allowing said second enlarged portion to be aligned with and pass through the openings and then to be locked against withdrawal after rotation of said fastener a predetermined angle about said axial direction;

the maximum dimension of said first enlarged portion is smaller than the maximum dimension of said first opening and is greater than the minimum dimension of said first opening, thereby allowing said first enlarged portion to be aligned with and pass through the first opening and then to be locked against withdrawal after rotation of said fastener the predetermined angle about said axial direction; and in the whole elongated body, said second neck portion has smallest dimensions in both said first and second radial directions, thereby defining a weakest point of said elongated body which will be first ruptured upon application of sufficient stress to said elongated body.

12. In the combination of claim 11, wherein said head comprises a collar which has an axially moveable locking element partially received in the first opening to lock against further rotation of said fastener about said axial axis.

* * * * *